United States Patent [19]

Kakimoto et al.

[11] Patent Number: 4,810,002
[45] Date of Patent: Mar. 7, 1989

[54] DOUBLE LINK TYPE SUSPENSION SYSTEM

[75] Inventors: Toshihiko Kakimoto, Isehara; Takuya Murakami, Atsugi; Shinichi Morita, Zama, all of Japan

[73] Assignee: Nissan Motor Co., Ltd., Japan

[21] Appl. No.: 72,047

[22] Filed: Jul. 10, 1987

[30] Foreign Application Priority Data

Jul. 15, 1986 [JP] Japan ................. 61-166127
Aug. 14, 1986 [JP] Japan ................. 61-191004
Aug. 14, 1986 [JP] Japan ................. 61-124957[U]

[51] Int. Cl.$^4$ ............................. B60G 3/20
[52] U.S. Cl. ........................... 280/666; 280/670; 280/696
[58] Field of Search ............ 280/666, 668, 670, 673, 280/674, 696, 701, 724

[56] References Cited

U.S. PATENT DOCUMENTS

| | | | |
|---|---|---|---|
| 3,630,303 | 12/1971 | Froumajou | 280/666 |
| 4,538,831 | 9/1985 | Kami et al. | 280/666 |
| 4,570,969 | 2/1986 | Tsutsumi et al. | 280/664 |
| 4,583,759 | 4/1986 | Kami et al. | 280/673 |

FOREIGN PATENT DOCUMENTS 1573273 5/1969 France.
59-96007 6/1984 Japan.
60-135314 7/1985 Japan.

Primary Examiner—Kenneth R. Rice
Attorney, Agent, or Firm—Leydig, Voit & Mayer

[57] ABSTRACT

A double link type front suspension system for an automotive vehicle of the front engine front drive type or the four wheel drive type is comprised of upper and lower control arms for swingable connecting a knuckle for rotatably supporting a front wheel to a vehicle body. A curved extension bracket is provided to rotatably connect the knuckle upper section with the upper control arm. The extension member is movably connected at its upper end section with the outboard end section of the upper control arm and rotatably connected at its lower end section with the knuckle upper section. The relative rotation between the extension member and the knuckle upper section is made around a straight line (steering) axis) passing through a ball joint for connecting the knuckle lower section and the lower control arm, thereby making it possible to set the steering axis regardless of the upper control arm.

28 Claims, 9 Drawing Sheets

DOUBLE LINK TYPE SUSPENSION SYSTEM

BACKGROUND OF THE INVENTION

1. Field of the Invention

The present invention relates generally to a double link type suspension system, for example, in use for an automotive vehicle, and more particularly to a double wish-bone type suspension system having upper and lower control arms and a shock absorber whose one end is attached to the side of a vehicle body and whose other end is connected directly or through the lower control arm to a knuckle.

2. Description of the Prior Art

In connection with automotive vehicles, a variety of double link type suspension systems have been proposed and put into practical use as disclosed, for example, in Japanese Patent Provisional Publication No. 59-96007 (referred hereinafter to as "the first prior art") and in Japanese Patent Provisional (First) Publication No. 60-135314 (referred hereinafter to as "the second prior art"). In a suspension system of the first prior art, an upper section of a knuckle is upwardly extended over a wheel to form an upper end thereof, which upper end is connected through an upper control arm to a vehicle body. In a suspension system of the second prior art, an upper control arm is prolonged as compared with as usual, and a steering axis (kingpin axis) is set regardless of the upper control arm.

Now in order to obtain a suitable suspension geometry, the upper control arm of the double link type suspension system is required to ensure a considerable length and therefore cannot be so shortened.

The above-summarized prior arts will be discussed. In the case of the first prior art suspension system, the inboard end of the upper control arm is supported by a vehicle body while the outboard end of the same is connected to the upper end of the knuckle, and additionally the upper control arm cannot be shortened for the above-mentioned reason, thereby allowing a wheel house to extend to the side of an engine compartment in accordance with the length of the upper arm. In addition, a shock absorber is disposed generally parallel with the upwardly extended knuckle upper section. Thus, the width of the wheel house is enlarged thereby to unavoidably minimize the width of the engine compartment. Particularly in this first prior art suspension system, since the knuckle which is disposed parallel to the shock absorber is turned together with the wheel during steering, a sufficiently wide space is necessary between them in order to prevent interference therebetween during turning of the vehicle. This particularly enlarges the width of the wheel house. Furthermore, the turning of the knuckle together with the wheel requires a ball joint having a large height for connection between the upper end of the knuckle and the upper control arm, so that the height of the wheel house is unavoidably enlarged.

In the case of the second prior art suspension system, the distance between the upper and lower control arms is relatively small, variation of camber angle and caster angle due to assembly error of suspension system component parts ends up being relatively large. Additionally, such camber angle and caster angle change greatly depending upon the vertical swing of the upper and lower control arms. Therefore, the vehicle steering is not sufficiently controllable.

SUMMARY OF THE INVENTION

An object of the present invention is to provide an improved double link type suspension system for a vehicle, adapted to increase freedom of selection of location of the outboard end section of an upper control arm by separating elements for setting a steering axis and elements for setting camber angle, thereby minimizing the width and height of a wheel house as much as possible to enlarge the width of an engine compartment located thereinside while suitably setting wheel alignment.

Therefore, a double link type suspension system of the present invention is comprised of a knuckle for rotatably supporting a wheel of a vehicle. The lower section of the knuckle is movably connected to the outboard end section of a lower control arm by a joint, the inboard end section of the lower control arm being movably connected to a vehicle body side. The upper section of the knuckle is movably connected to a lower end section of an extension member which is rotatable around a straight line passing through the joint. The upper end section of the extension member is movably connected to the outboard end section of an upper control arm whose inboard end section is movably connected to the vehicle body side. The upper end section of the extension member extends above the top of a wheel which is supported by the knuckle.

Thus, a steering axis corresponds to the straight line passing through both the joint between the knuckle lower section and the lower control arm outboard end section and another joint between the knuckle upper section and the extension member lower end section, and therefore the upper control arm can be situated independently of the steering axis. Additionally, the component parts which are turnable together with the wheel (tire) are limited to ones located between both the joints, i.e., near an axle shaft of the wheel. Consequently, interference among the component parts during steering can be suppressed as much as possible. This allows the width of the wheel house to become small, thereby enlarging the width of an engine compartment upon combination with the effect of no relation of the upper control arm to the steering axis so that a point at which the upper control arm inboard end section is attached to the vehicle body side is situated near the side section of the vehicle body. Additionally, since the extension member does not turn with the knuckle during steering, the extension member and the upper control arm can be connected with each other by a joint using an elastomeric insulation bushing, thereby minimizing the height of the joint as compared with a ball joint. This lowers the top level of the wheel house and therefore of a hood defining the engine compartment.

Furthermore, variation of camber angle (determined by both the upper and lower control arms) along with vertical movement of the wheel can be suppressed to a lower value, because the upper control arm has no relation to setting of the steering axis and therefore can be lengthened while enlarging the distance between the upper and lower control arms by virtue of employing the extension member. This greatly contributes to appropriate setting of wheel alignment.

BRIEF DESCRIPTION OF THE DRAWINGS

In the drawings, in which like reference numerals designate like elements and parts.

DETAILED DESCRIPTION OF THE INVENTION

Figure 1:
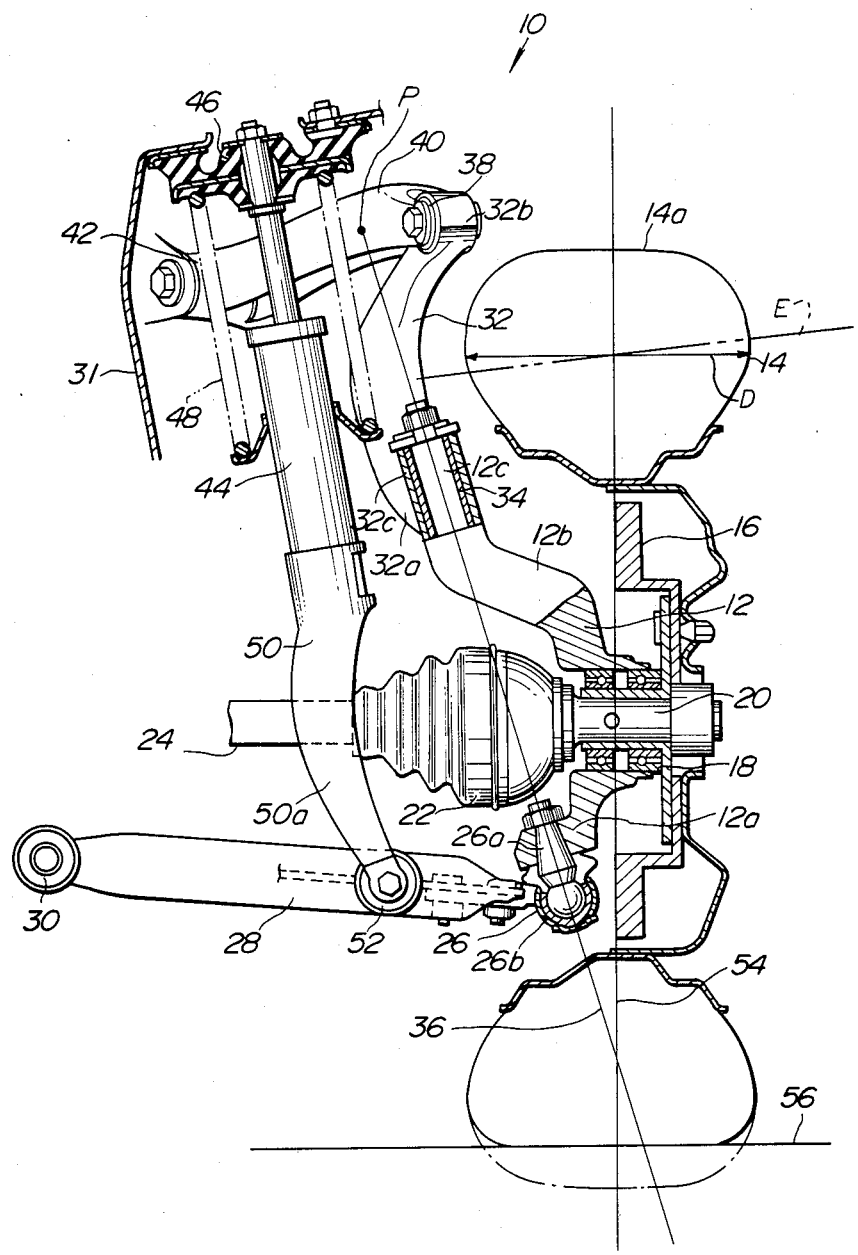
FIG. 1 is a fragmentary front elevation, partly in section, of a first embodiment of a double link type suspension system in accordance with the present invention.

Referring now to FIG. 1, there is shown a first embodiment of a double link type suspension system 10 in accordance with the present invention. The suspension system 10 of this embodiment is a front suspension system of the double wish-bone type and is used for an automotive vehicle of the type wherein a driving force from an engine (not shown) is transmitted to front wheels, the vehicle being, for example, of the front engine front wheel drive (FF) type or he four wheel drive (4WD) type. The suspension system 10 is comprised of a steering knuckle 12 for rotatably supporting a front wheel 14 provided with a brake disc 16. The knuckle 12 rotatably journals through a bearing 18 an axle shaft 20 of the wheel 14 which shaft 20 is connected through a constant velocity joint 22 to a drive shaft 24 driven under the driving force from the engine.

The lower section 12a of the knuckle 12 is connected through a ball joint 26 to the outboard end section of a lower control arm 28 whose inboard end section is connected through a rubber insulation bushing 30 to a bracket (not shown) of a vehicle body 31. The ball joint 26 includes a ball stud 26a secured to the knuckle lower section 12a, and a retainer 26b which is secured to the outboard end section of the lower control arm 28. The upper section 12b of the knuckle 12b is rotatably connected to an extension bracket (member) 32. More specifically, the knuckle upper section 12b is formed with an upwardly extending shaft portion 12c. A lower end section 32a of the extension member 32 is formed with a cylindrical portion 32c which is fitted through a bushing 34 (made of plastic) around the shaft portion 12c so as to be rotatable relative to the shaft portion 12c. As illustrated, the center axis of the knuckle shaft portion 12c is aligned with the center axis of the ball stud 26a of the ball joint 26. The center axis of the knuckle shaft portion 12c also serves as the axis of rotation of a joint including the bushing 34 and the cylindrical portion 32c of the extension member 32. Accordingly, a straight line or axis aligned with the center of the knuckle shaft portion 12c and the center axis of the ball joint 26 serves as a steering axis or kingpin axis 36. The bushing 34 may be formed of a material other than plastic or may be replaced with a plain bearing such as one made of bearing metal. Additionally, an antifriction bearing may be used in place of the bushing 34. Although the joint between the knuckle 12 and the extension bracket 32 has been shown and described as using the bushing 34, it will be understood that the joint may be replaced with other means for connecting the knuckle 12 to the extension member 32 in a condition in which the center of rotation of the joint is aligned with the steering axis 36.

The extension bracket 32 is extended upward and curved outward relative to the vehicle body 31 in a manner so as to surround the upper section of the wheel 14 so that the upper end section 32b of the extension bracket 32 reaches a position above the uppermost section 14a of the wheel 14. The upper end section 32b is swingably connected through a rubber insulation bushing 38 to the outboard end section of an upper control arm 40 whose inboard end section is swingably connected through a rubber insulation bushing 42 to a bracket (not shown) of the vehicle body 31. It will understood that the rubber insulation bushing 38 is adequate for the joint between the extension bracket 32 and the upper control arm 40 because the extension member 32 is merely swingable relative to the upper bracket arm 40.

As shown in the drawings, in accordance with the present invention, the joint between the upper end section 32b of the extension bracket 32 and the outboard end section of the upper control arm 40 lies radially outwards with respect to the radial center of the wheel 14 from a plane E which is substantially parallel to the plane of the ground and which passes through the center of a line D which connects the points of maximum width of the top of the tire of the wheel 14. Furthermore, the joint between the uppermost section 12b of the knuckle 12 and the lower end section 32a of the extension bracket 32 lies radially inwards of this plane E with respect to the radial center of the wheel 14. This plane E may coincide with the line D defining the maximum width of the top of the tire, or it may be sloped with respect thereto, as shown in FIG. 1.

A shock absorber 44 is generally vertically installed between the vehicle body 31 and the lower control arm 7 in such a manner as to be generally parallel with the knuckle shaft portion 12c and the extension bracket 32. The upper end section of the shock absorber 44 is connected through a mounting rubber 46 to the vehicle body 31. A coil spring 48 is disposed coaxially around the shock absorber 44. The lower end section of the shock absorber 44 is secured through a fork 50 and rubber insulation bushings 52 to the lower control arm 28. More specifically, the shock absorber lower end section is securely supported at the upper end section of the form 50 which is bifurcated to form two leg sections 50a (only one leg section shown) between which the drive shaft 24 is located, thereby preventing interference between the fork 50 and the drive shaft 24.

Although the shock absorber 44 has been shown and described as being connected at its lower end side to the lower control arm 28, it will be appreciated that the lower end side of the shock absorber may be attached to the extension bracket 32. In this case, load applied to the lower control arm 28 is minimized thereby allowing the strength of the lower control arm and the attaching section therefor to be lowered while reducing the weight of them. Additionally, no bifurcated fork is required.

Thus, in this embodiment, the center line 54 of the wheel 14 (in the direction of width of the wheel in a cross-section including the axis of rotation of the wheel) crosses the steering axis 36 at a position above a plane 56 at which the wheel (tire) 14 is in contact with the ground or road surface as illustrated in FIG. 1. Furthermore, the steering axis 36 intersects the plane 56 at a position lying outward of the wheel center line 54, thereby setting a so called negative scrub radius. It is to be noted that since the steering axis 36 is determined by locations of both the joint between the knuckle 12 and the extension bracket 32 and the joint between the knuckle 12 and the lower control arm 28, setting the scrub radius to be positive, negative or zero is not related to the arrangement of the upper control arm 40. Consequently, the rubber insulation bushing 38 between the upper control arm 40 and the extension bracket 32 can be located without restraint from the steering axis 36. In this connection, in this embodiment, the rubber insulation bushing 38 is located above the wheel 14 so as to project outward relative to the vehicle body so that the rubber insulation bushing 38 and the wheel 14 overlap each other in the widthwise direction of the vehicle. This ensures a sufficient length to obtain an appropriate wheel alignment while locating the inboard end section of the upper control arm 40 at a position near the outside of the vehicle in the widthwise direction of the vehicle. This is a reason why the width of a tire house is minimized, thereby enlarging the width of an engine compartment.

Thus, ensuring the sufficient length of the upper control arm 40 minimizes the difference in length between it and the lower control arm 28, thereby making possible to obtain the optimum wheel alignment. Additionally, since the vertical distance between the upper and lower control arms 40, 28 can be enlarged, variation of camber angle and caster angle due to assembly error of the suspension component parts can be minimized while suppressing development of variation of the camber angle during vertical movement of the wheel 14. Additionally, the rigidity of both the arms 40, 28 increases proportional to the square of the distance between the both the arms, and therefore the rigidity of them is enlarged thereby improving the marginal performance of camber angle variation.

As appreciated, the weight of the vehicle body is supported by the wheel 14 through the mounting rubber 46, the coil spring 48, an outer cylinder of the shock absorber 44, the lower control arm 28 and the knuckle 3. The vertical movement of the wheel 14 can be damped under expansion and contraction of the shock absorber 44 and absorbed under deflection of the coil spring 48. Here, during vertical movement of the wheel 14, the knuckle 12 and the extension bracket 32 make their vertical movement together with the wheel 14, so that the lower and upper control arms 40, 28 swing vertically. Along with this, the shock absorber 44 and the coil spring 48 perform expansion and contraction. Thus, since all such members perform vertical movement, no interference occurs between a section including the upper section 12b of the knuckle 12 and the extension bracket 32 and another section including the shock absorber 44 and the coil spring 48.

It will be understood that when steering force or effort is transmitted from a steering linkage (not shown) through a knuckle arm (not shown) integral with the knuckle 12, the knuckle 12 performing rotation around the steering axis 36, thereby turning the wheel 14 to steer the vehicle. At this time, the knuckle 12, wheel 14 and the axle shaft 20 turn around the steering axis 36 in which the knuckle 12 is rotatable in the joint including the bushing 34 and therefore the extension bracket 32 does not turn. As a result, since the extension bracket 32 makes only the above-mentioned vertical movement so that its relative movement to the upper control arm 40 is only swinging, a ball joint is unnecesary for the joint between the extension bracket 32 and the upper control arm 40, so that the rubber insulation bushing 38 is sufficient for this joint. The rubber insulation bushing 38 is smaller in height than the ball joint, and consequently the height of the wheel house is minimized thereby lowering the level of the hood of the engine compartment. In this connection, the rubber insulation bushing is smaller by about 40 mm in height than the ball joint usually used for a control arm of a double wish-bone type suspension system.

Furthermore, the fact that no rotation is made in the extension bracket 32 during vehicle steering leads to the fact of making no relative displacement of the shock absorber 44 and the coil spring 48 to the extension bracket 32, thereby preventing interference therebetween. As a result, the distance between the shock absorber 44 and the extension bracket 32 is minimized, thus making it possible to minimize the width of the wheel house and accordingly to enlarge the engine compartment in combination with the fact of increased freedom of location of the upper control arm 40.

Moreover, during vehicle starting or braking, relative displacement force developed between the vehicle body 31 and the wheel 14 acts along an extension of the steering axis 36 on the upper control arm 40. In other words, the relative displacement force is input to a point P positioned midway between the inboard and outboard end sections of the upper control arm 40. Thus, such force input is made to the position nearer to the vehicle body 31 than in a case in which the same force input is made to the outboard end section of the upper control arm 40, and therefore less load due to such force input is applied to a portion of the vehicle body 31 to which the inboard end section of the upper control arm 40 is attached. This makes it possible to lighten the weight of the vehicle body portion to which the upper control arm is attached, and minimize the size and soften the rubber insulation bushing 42 used in the joint between the upper control arm 40 and the vehicle body 31. Such softening of the rubber insulation bushing leads to an increase in absorption efficiency for vibration input from the side of the wheel 14, thus reducing vehicle vibration and booming noise due to the vibration.

As a result, the suspension system of the present invention offers both the advantageous effects of the above-discussed first and second prior art inventions as shown in Table 1, and additionally offers the unique advantageous effects summerized as follows:

(1) Since no relative displacement is made between the extension member (bracket) and the shock absorber, the space between them can be narrowed therby narrowing the wheel house and therefore enlarging the width of the engine compartment.

(2) Since the extension member does not turn during vehicle steering, it is possible to use the rubber insulation bushing in the joint between the upper control arm and the extension member, thereby minimizing the height of the joint as compared with the case of using a ball joint. This minimizes the height of the wheel house therby lowering the hood of the engine compartment.

(3) Since the relative displacement force developed between the vehicle body and the wheels during vehicle starting and braking is input to the upper control arm at a position lying on the extension of the steering axis, the thus input force is applied to a location nearer to the vehicle body than in the case where the same force is input to the outboard end of the upper control arm. Accordingly, less load due to the above-mentioned input force is applied to the arm attaching portion of the vehicle body, thereby making it possible to lighten the vehicle body arm attaching portion and minimize and soften of the joint. Such softening of the joint suppresses vibration transmission to the vehicle body, thereby reducing booming noise due to the vibration transmission.

(4) Since setting of the steering axis is independent of the position of the upper control arm, the attaching location of the upper control arm to the vehicle body can be situated outward in the direction of the vehicle body width, so that the outboard end of the upper control arm is freely selectable. Thus, the width of the engine compartment is enlarged in combination with the above-mentioned reason discussed in (1). Additionally, it is possible to determine the length of the upper control arm so as to obtain a suitable wheel alignment.

(5) If the joint between the knuckle upper section and the extension member are constructed of two bearings or ball joints which are positioned on the steering axis and spaced from each other, a force couple acting on the joint is removed so that movement of the upper control arm cannot be obstructed.

TABLE 1

| Feature in arrangement | Item | Effect | Evaluation of effect | | |
|---|---|---|---|---|---|
| | | | Present invention | First prior art | Second prior art |
| A case an upper arm is located at a higher position as in the first prior art | Assembly accuracy | Since the distance between upper and lower control arms is large, variation of camber angle and caster angle due to assembly error is small. | A | A | D |
| | Rigidity against camber angle variation | Since the distance between both control arms is large, rigidity against variation of camber angle is large. In other words, the ridigity increases proportional to the square of the distance between both the control arms. (As a result, marginal performance of camber angle variation is high.) | B | B | D Note (1) |
| | Force input to upper control arm | Since the distance between both control arms is large, force input to vehicle body is small relative to lateral and fore-and-aft direction forces and the like at a ground-contacting plane of tire. As a result, rigidity of upper control arm can be minimized thereby to weight-lighten it and lower production cost. | B | B | D Note (1) |
| | Variation of camber angle | Since the distance between both control arms, camber angle variation is hardly developed even under vibration of both the control arms. | B | B | D |
| | Adaptation for FF vehicle | An FF vehicle requires a drive shaft for front wheels, and therefore there is no space for upper control arm inside a road wheel. | A | A | D |
| A case upper control arm is longer, and steering axis is set relardless of the upper control arm as in the second prior art | Variation of camber angle | Since upper control arm is longer so as to be small in difference between it and lower control arm, evariation of camber angle is made smaller. | A | D | A |
| | Space in vehicle body frame (1) | Since upper control arm can be projected outward of vehicle body, the width of engine compartment is enlarged. | B | D | B |
| | Space in vehicle body frame (2) | Since upper control arm is longer, the distance of entering of tire upper-most section into vehicle body is smaller during bound, the width of engine compartment can be enlarged. | B | C | B |
| | Jack-down | During vehicle turning, displacement amount of both control arms is smaller, and tendency of down-force development is smaller. | B | D | B |
| A case a steering axis is set regardless of upper control arm, and the upper control arm is longer and situated at a higher position and disposed near the outside of vehicle | Space in vehicle body frame (3) | There is no relative displacement between extension bracket and shock absorber, it is possible to narrow the space therebetween. Accordingly, the width of engine compartment is enlarged. | A | D | C Note (3) |
| | Height of Hood from the ground | Since extension bracket does not turn, the joint between upper control arm outboard end and extension bracket is sufficient to employ bushing. Consequently, the height dimention of the joint is minimized as compared with in the case of ball joint, thereby lowering wheel house by about 40 mm. | A | D | C Note (2) |
| | Force Input during braking and starting | Force input to upper control arm is made at a point P in the drawing but not at the outboard end (pivot point), and it is possible that force input to vehicle control arm attaching portion is minimized, | B | D | D |

TABLE 1-continued

| Feature in arrangement | Item | Effect | Evaluation of effect | | |
|---|---|---|---|---|---|
| | | | Present invention | First prior art | Second prior art |
| | Length of upper control arm | vehicle body is weight-lightened, and bushing is small-sized (improving durability) and softened (improving noise and vibration absorption effect). If the vehicle body side pivotal position of upper control arm is sufficiently projected outward of vehicle body in order to enlarge engine compartment, freedom of selection of the position of bushing at the control arm outboard end section is larger, thereby ensuring a suitable length of the control arm. | A | D | C Note (3) |

Meaning of character for "Evaluation of Effect":
A ... excellent
B ... good
C ... insufficient
D ... no effect
Note
(1) Chassis frame is necessary in connection with rigidity against camber angle variation.
(2) There are no control arms and bushings located at higher positions at all.
(3) Interference between upper control arm and an axle occurs if the upper control arm is longer.

Figure 2:
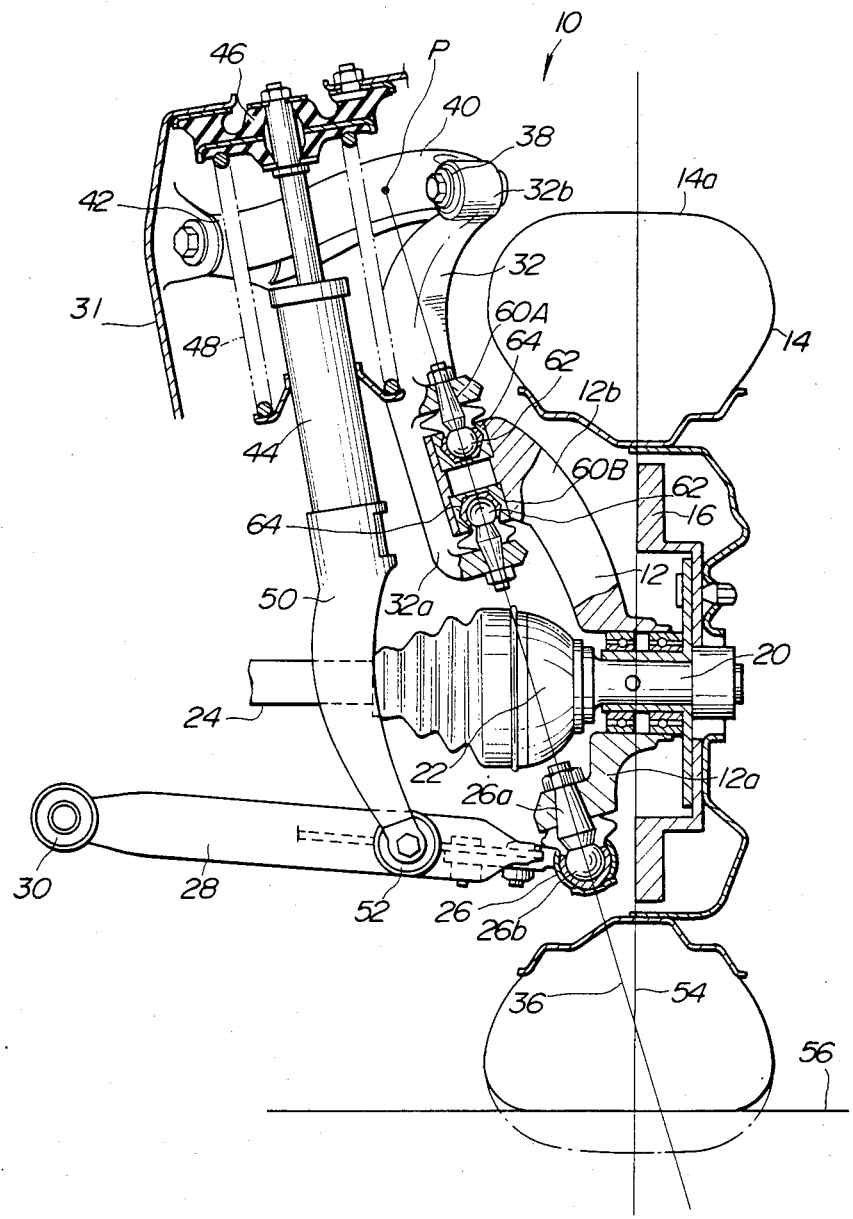
FIG. 2 is a fragmentary front elevation similar to FIG. 1 but showing a second embodiment of the suspension system in accordance with the present invention.

FIG. 2 illustrates a second embodiment of the suspension system according to the present invention, similar to the first embodiment with the exception that the joint between the knuckle upper section 12b and the extension bracket 32 includes two ball joints 60A, 60B. In this embodiment, ball studs 62 of the two ball joints 60A, 60B are secured to the lower end section 32a of the extension bracket 32, while retainers 64 of the two ball joints are secured to the upper section 12b of the knuckle 12, so that the knuckle upper section 12b is rotatable relative to the extension bracket 32. As shown, the two ball joints 60A, 60B are located symmetrical with each other in such a manner that their center axes are aligned with each other. Additionally, the axes of the two ball joints 60A, 60B are aligned with the steering axis 36 passing through the ball joint 26 or aligned with the center axis of the ball joint 26.

With this arrangement, friction of the joint between the extension member 32 and the knuckle upper section 12b is smaller than in the arrangement of the first embodiment, thereby decreasing poor steering return and steering hesitation.

Figure 3:
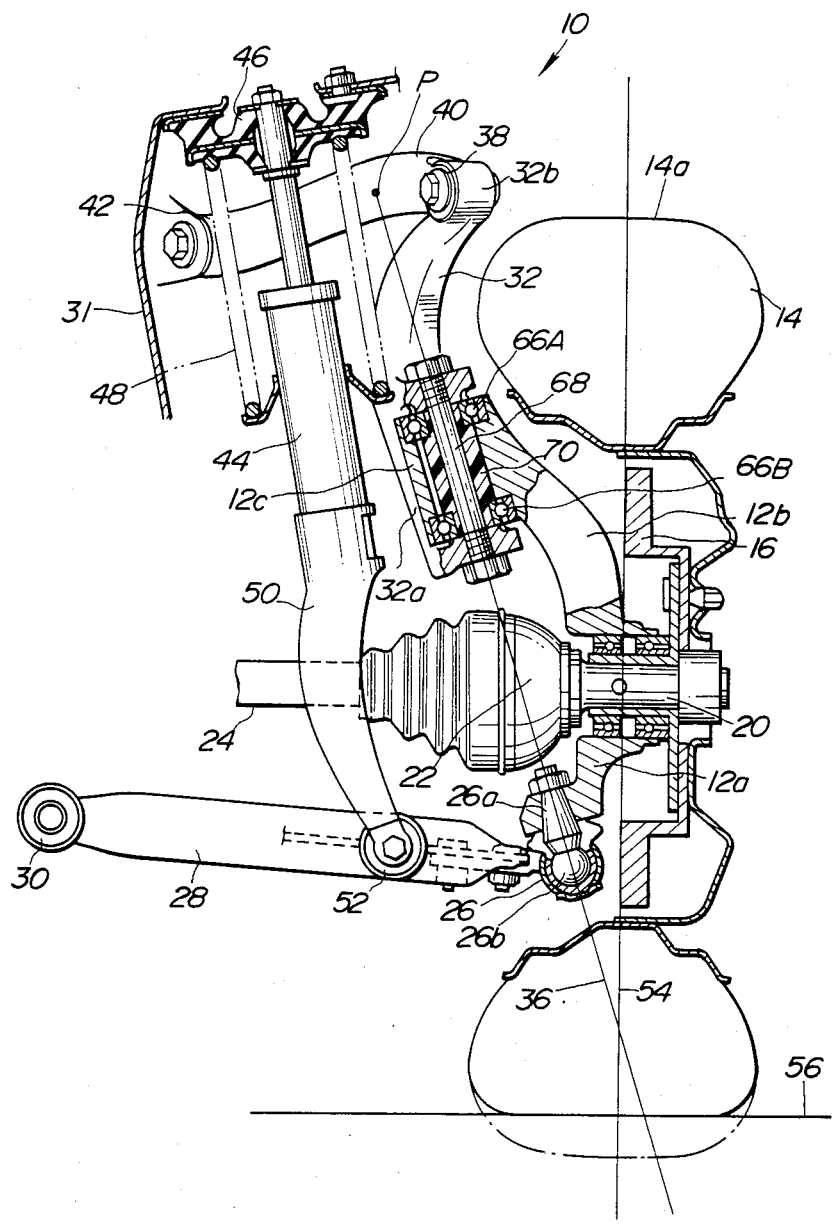
FIG. 3 is a fragmentary front elevation similar to FIG. 1 but showing a third embodiment of the suspension system in accordance with the present invention.

FIG. 3 illustrates a third embodiment of the suspension system according to the present invention, which is similar to the second embodiment with the excepion that anti-friction bearings (ball bearings) 66A, 66B are used in place of the ball joints 60A, 60B of the second embodiment. In this embodiment, the knuckle upper section 12b is formed with a cylindrical portion 12c. The two ball bearings 66A, 66B are disposed between the inner periphery of the cylindrical portion 12c and the outer periphery of a cylindrical sleeve 70 fitted on a bolt 68 secured to the extension member lower end section 32a. The ball bearings 66A, 66B are spaced from each other and so arranged that the axis of rotation thereof and the center axis of the bolt 68 are aligned with the steering axis 36 passing through the ball joint 26 or aligned with the center axis of the ball joint 26. It will be understood that roller bearings may be used in place of the ball bearings 66A, 66B, in which tapered roller bearings are preferable in order to receive thrust.

Figure 4:
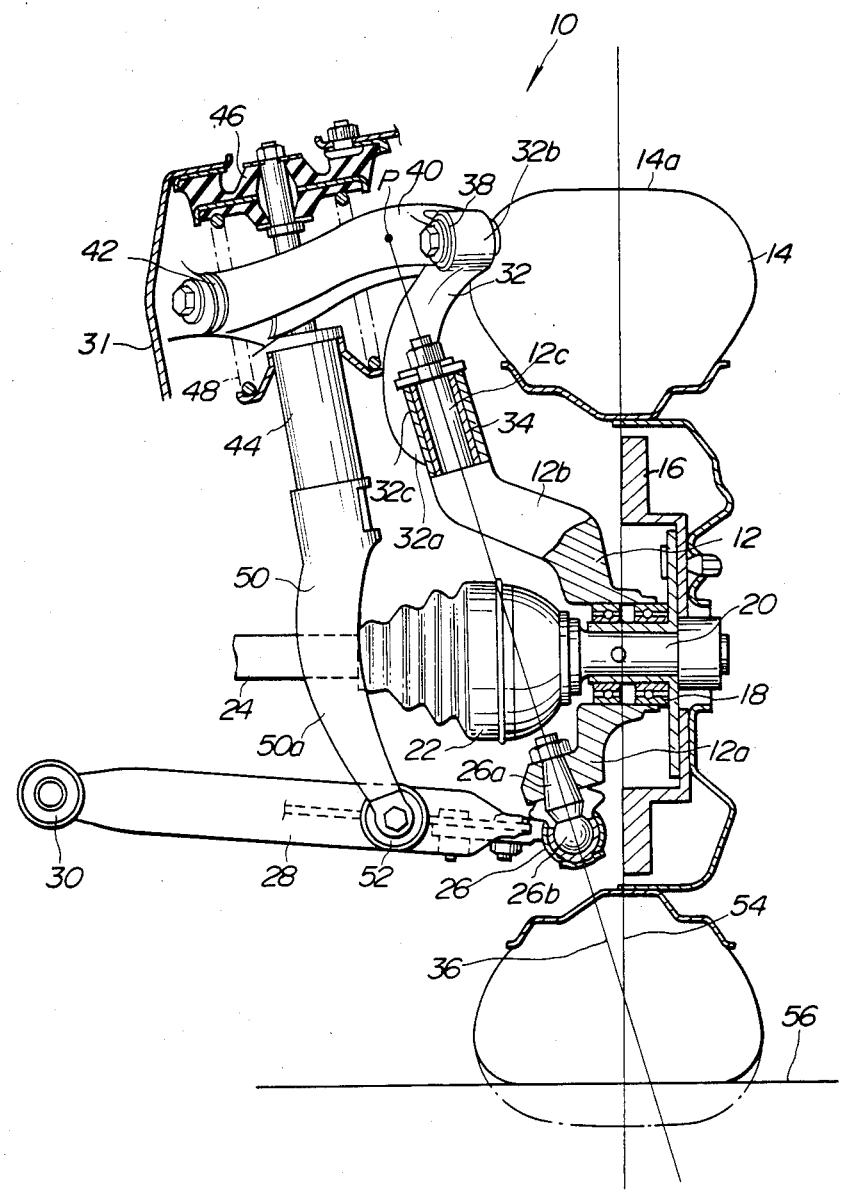
FIG. 4 is a fragmentary front elevation similar to FIG. 1 but showing a fourth embodiment of the suspension system in accordance with the present invention.
Figure 5:
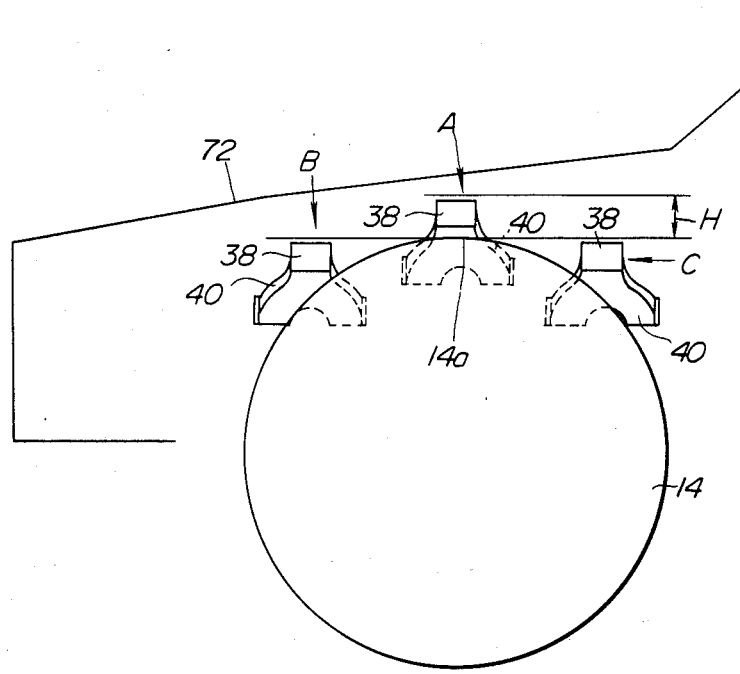
FIG. 5 is a schematic side illustration showing the geometric relationship between an upper control arm and a wheel.
Figure 6:
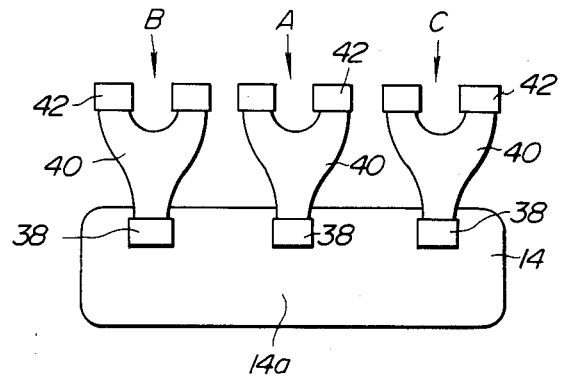
FIG. 6 is a schematic plan illustration showing the geometric relationship between the upper control arm and the wheel in connection with FIG. 5.

FIG. 4 illustrates a fourth embodiment of the suspension system according to the present invention, which is similar to the first embodiment except for the location of the joint between the extension bracket 32 and the upper control arm 40. In this embodiment, the upper end section 32b of the extension bracket 32 is located forward of the upper-most section 14a of the wheel (tire) 14 and and swingably connected through the rubber insulation bushing 38 to the outboard end section of the upper control arm 40. Such an arrangement is indicated by "B" in FIGS. 5 and 6 in which the rubber insulation bushing 38 is positioned below the level of the uppermost section 14a of the wheel 14 and one-sided laterally outward of the vehicle body in such a manner as to lie above the ground- contacting surface of the wheel (tire) 14, preventing interference with the wheel 14. Thus, since the location of the rubber insulation bushing 38 is situated forward of the wheel uppermost section 14a, the ruber insulation bushing location can be lowered as indicated by "B" in FIG. 5 by a vertical distance H as compared with in a case where the rubber insulation bushing 38 is situated above the wheel uppermost section 14a as indicated by "A" in FIG. 5. This lowers the location of the upper control arm 40 and the mounting rubber 46, thereby lowering the hood 72 of the engine compartment as seen from FIG. 5. It will be understood that the extension bracket upper end section 32b (the rubber insulation bushing 38) may be otherwise located rearward of the wheel uppermost section 14a as indicated by "C" in FIGS. 5 and 6.

Figure 7:
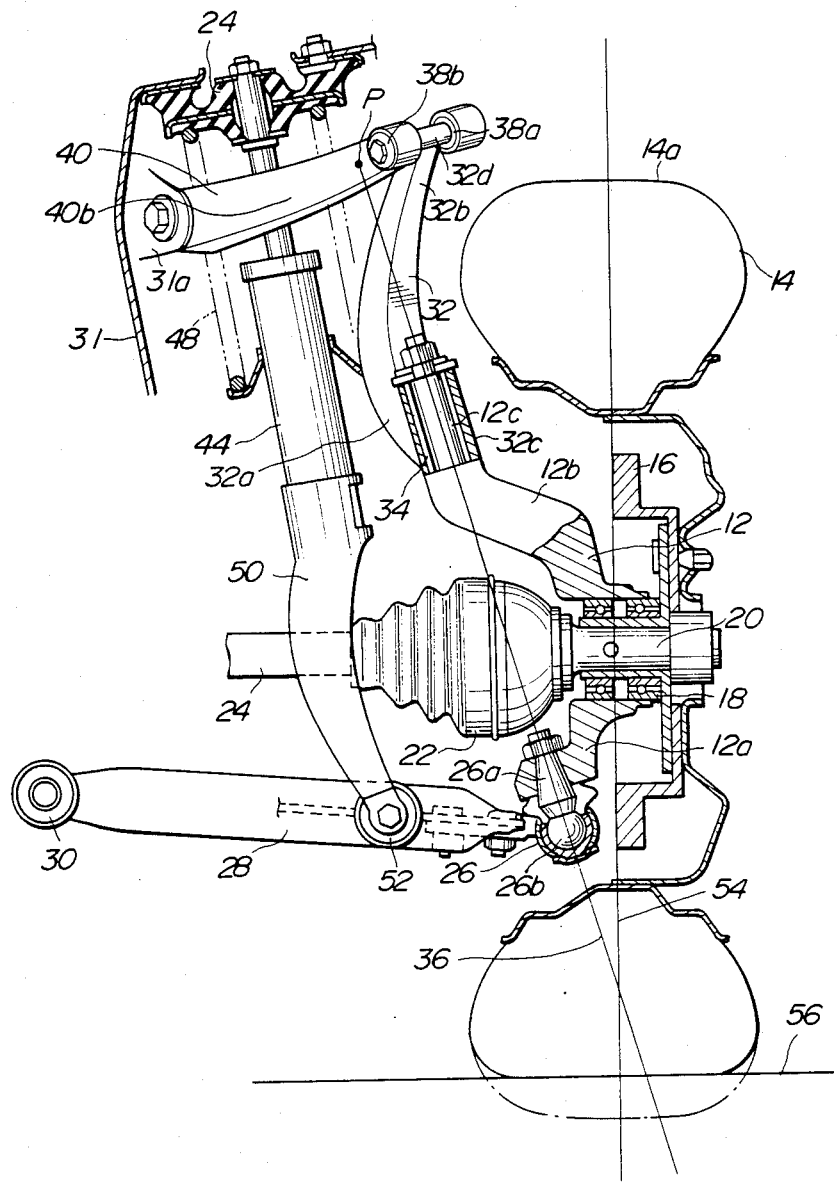
FIG. 7 is a fragmentary front elevation similar to FIG. 1 but showing a fifth embodiment of the suspension system in accordance with the present invention.
Figure 8:
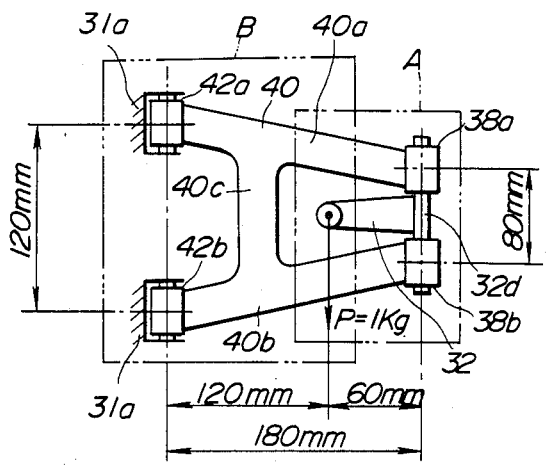
FIG. 8 is an illustration of an upper control arm, showing the effect of the fifth embodiment of FIG. 7.

FIG. 7 illustrates a fifth embodiment of the suspension system according to the present invention, which is similar to the first embodiment of FIG. 1 except for the arrangement of the joint between the extension bracket 32 and the upper control arm 40. In this embodiment, the upper control arm 40 is generally H-shaped in plan as shown in FIG. 8 and includes two longer straight elongated sections 40a, 40b and a shorter straight elongated section 40c for integrally connecting the longer elongated sections 40a, 40b. The inboard end portions of the longer elongated sections 40a, 40b are respectively connected through the rubber insulation bushings 38a, 38b to the upper end section 32b of the extension bracket 32. More specifically, the inboard end portion of each longer elongated section 40a is formed with a cylindrical part (no numeral) which is generally coaxially mounted through the bushing 42a (42b) on a rod member (no numeral) secured to the bracket 31a. Accordingly, the bushing 42a (42b) is cylindrical and interposed between the inner peripheral surface of the cylindrical part of the longer section 40a and the outer peripheral surface of the rod member. Similarly, the outboard end portion of each longer section 40a (40b) is formed with a cylindrical part (no numeral) which is generally coaxially mounted through the bushing 38a (38b) on a rod member 32d secured to the upper end section 32b of the extension bracket 32. Accordingly, the bushing 38a (38b) is generally cylindrical and interposed between the inner peripheral surface of the cylindrical part of the longer section 40a (40b) and the outer peripheral surface of the rod member 32d. Both the rubber insulation bushing 42a, 42b are positioned generally coaxially along a first common axis indicated by a dot-dash line in FIG. 8, and similarly both the rubber insulation bushings 38a, 38b are positioned generally coaxially along a second common axis indicated by a dot-dash line in FIG. 8, in which the first and second common axes are parallel with each other. Additionally, the upper end section 32b and the rod member 32d of the extension bracket 32 is formed generally into the shape of a T so that the extension bracket upper end section 32b is integrally connected to the rod member 32c at an intermedite part between the bushings 38a, 38b. Thus, the upper control arm 40 is pivotally connected at its inboard end section with the vehicle body side and pivotally connected at its outboard end section to the extension bracket upper end section 32b.

With the above-discussed arrangement of this embodiment, the weight of the vehicle body is supported by the wheels 14 through the mounting rubber 46, the fork 50, the lower control arm 28 and the knuckle 12. Vertical movement of the wheel 14 is damped under expansion and contraction of the shock absorber 44 and absorbed under deflection of the coil spring 48.

Here, referring to FIG. 8, when a unit force of 1 kg is exerted onto the point P (in FIG. 7) of the upper control arm 40 from the front of the vehicle on the assumption that the distance between the two bushings 42a, 42b (at their axial center) on the vehicle body side is 120 mm; the distance between the two bushing 38a, 38b (at their axial center) on the wheel side is 80 mm; the distance between the first common axis (for the bushings 42a, 42b) and the second common axis (for the bushings 38a, 38b) is 180 mm; the distance between the first common axis (for the bushings 42a, 42b) and the force input point P is 120 mm; the pinch rigidity of the four bushings 42a, 42b, 38a, 38b is 3000 kgmm/deg; and the rigidity of the same bushings 42a, 42b, 38a, 38b in the direction pependicular to their axis is 500 kg/mm, the deflection $y_P$ at the force input point P is given by Eq. (1), $$Y_p = y_a + y_b \quad (1)$$

where $y_a$ is the deflection due to a system A shown in FIG. 8, and $y_b$ is the deflection due to a system B in FIG. 8.

The deflection $y_a$ due to the system A is given by Eq. (2), $$y_a = 1 \times \frac{60}{80} \times \frac{1}{500} \times 2 \times \frac{60}{80} \quad (2)$$
$$= 0.00225 \text{ (mm)}$$

The deflection due to the system B is given by Eq. (3), $$y_b = 1 \times \frac{120}{120} \times \frac{1}{500} \times 2 \times \frac{120}{120} \quad (3)$$
$$= 0.004 \text{ (mm)}$$

Accordingly, the total deflection $y_p$ of the system is calculated as follows:

$$y_p = y_a + y_b = 0.00225 + 0.004$$
$$= 0.00625 \text{ (mm)}$$

Consequently, the rigidity $G_p$ at the force input point P is obtained as follows:

$$G_p = 1/y_p = 1/0.00625$$
$$= 160 \text{ (kg/mm)}$$

The rigidity $G_p$ at the force input point P is increased and improved as compared with in other suspension systems as discussed hereinafter with reference to FIGS. 9 and 10.

Figure 9:
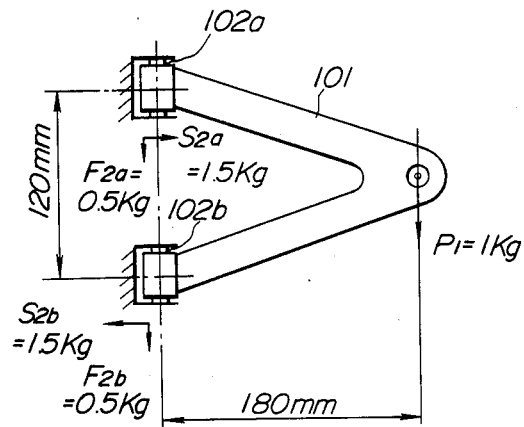
FIG. 9 is an illustration similar to FIG. 8 but showing an upper control arm of a prior art suspension system.

Referring to FIG. 9, the above-discussed first prior art double link type suspension system (disclosed in Japanese Patent Provisional Publication No. 59-96007) is provided with an upper control arm 101 through which a knuckle is connected to a vehicle body. With this arrangement, for example when a unit force of 1 kg is exerted at the force input point $P_1$ from the front of a vehicle under force input from the road surface on the assumption that the rigidity of two rubber insulation bushings 102a, 102b in the direction perpendicular to the axis thereof is 500 kg/mm, the distance between the bushings 102a, 102b is 120 mm, the distance between the common axis (for the bushings 102a, 102b) and the force input poit $P_1$ is 180 mm similarly in the arrangement of FIG. 8, the deflection $y_1$ at the force input point $P_1$ is given by Eq. (4), $$y_1 = 1 \times \frac{180}{120} \times \frac{1}{500} \times 2 \times \frac{180}{120} \quad (4)$$

Accordingly, the rigidity $G_1$ at the force input point $P_1$ is calculated as follows:

$$G_1 = 1/y_1 = 1/0.009$$
$$= 111.11 \text{ (kg/mm)}$$

In this case, although the rigidity $G_1$ at the force input point $P_1$ is maintained at a relatively high value, bushings 102a, 102b respectively receive 0.5 kg fore-and-aft direction components ($F_{2a}$, $F_{2b}$) of forces in the fore-and-aft direction of the vehicle and 1.5 kg lateral direction components ($S_{2a}$, $S_{2b}$) of forces in the rightward- and leftward of the vehicle. These lateral direction components of forces are transmitted as vehicle body input to the vehicle body.

Figure 10:
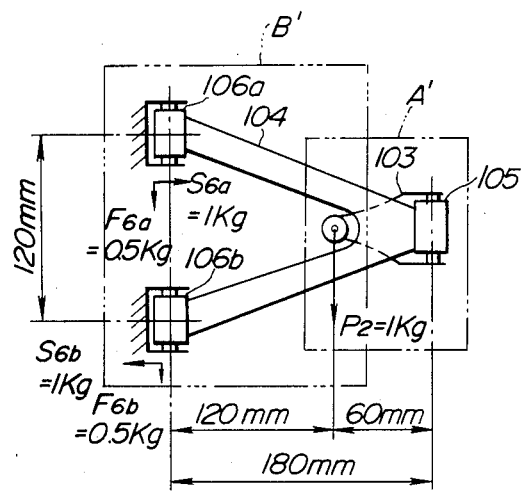
FIG. 10 is an illustration similar to FIG. 8 but showing an upper control arm different from that of the fifth embodiment.

However, since the above-discussed first prior art double link type suspension sysem provides many disadvantages as discussed before, the following double link type suspension system provided with an upper control arm 104 as illustrated in FIG. 10 will be proposed. Referring to FIG. 10, with this arrangement, when a unit force of 1 kg is exerted at a force input point $P_2$ of the upper control arm 104 from the front of the vehicle on the assumption that the distance between two rubber insulation bushings 106a, 106b on the vehicle body side is 120 mm, the distance between a common axis (for the bushings 106a, 106b) and an axis of a rubber insulation bushing 105 is 180 mm, the distance between the common axis for the vehicle body side bushings 106a, 106b and the upper control arm force input point $P_2$ is 120 mm, the pinch rigidity of the three bushings 106a, 106b, 105 is 3000 kg/mm, and the rigidity of the same bushings in the direction perpendicular to the aixs thereof is 500 kg/mm similarly to the arangement of FIG. 8, the deflection $y_2$ at the point $P_2$ is given by Eq. (5), $$y_2 = y_a' + y_b' \quad (5)$$

where $y_a'$ is the deflection due to a system A' shown in FIG. 10, and $y_b'$ is the deflection due to a system B' shown in FIG. 10.

Here, the deflection $y_{a'}$ due to the system A' is given by Eq. (6), $$y_a' = (180 - 120) \times \sin \frac{1 \times (180 - 120)}{3000} \quad (6)$$
$$= 0.0209 \text{ (mm)}$$

The deflection $y_{b'}$ due to the system B' is given by Eq. (7), $$y_b' = 1 \times \frac{120}{120} \times \frac{1}{500} \times 2 \times \frac{120}{120} \quad (7)$$
$$= 0.004 \text{ (mm)}$$

Accordingly, the total deflection $y_2$ of the systems is calculated as follows:

$$y_2 = y_a' + y_b' = 0.0209 + 0.004$$
$$= 0.0249 \text{ (mm)}$$

Consequently, the rigidity $G_2$ at the force input point $P_2$ is obtained as follows:

$$G_2 = 1/y_2 = 1/0.0249$$
$$= 40.16 \text{ (kg/mm)}$$

In this arrangement of FIG. 10, the element for setting a steering axis and the element for setting camber angle are separated from each other, thereby increasing freedom of selection of position of the upper control arm outboard end section, thus minimizing the width and the height of a wheel house and enlarging the width of an engine compartment while setting wheel alignment appropriately.

In the case of FIG. 10, the two bushings 106a, 106b respectively receive 0.5 kg force-and-aft direction components ($F_{6a}$, $F_{6b}$) of forces in the vehicle fore-and-aft direction and 1 kg lateral components ($S_{6a}$, $S_{6b}$) of forces in the vehicle rightward-and-leftward direction. These lateral components of force are transmitted as vehicle body input forces to the vehicle body.

In view of the above, according to the suspension system shown in FIGS. 7 and 8, the rigidity $G_p$ at the force input point P of the upper control arm 40 is about 1.5 times of that of the prior art arrangement of FIG. 9 and about 4 times of that of the arrangement of FIG. 10. Additionally, relative displacement force developed between the vehicle body and the wheel during vehicle braking or the like is adapted to the point P at which the steering axis intersects the plane of the upper control arm 40. Accordingly, such a force input point is nearer the vehicle body as compared with a case where force input is made at the outboard end section of the upper control arm, and therefore the load on an upper control arm attaching section of the vehicle body side is lowered. This makes it possible to lighten the weight of the upper control arm attaching section and minimize the size of and soften the vehicle body side bushings 42a, 42b. Hence, absorption efficiency for vibration input from the side of the wheel 14 is increased, thereby effectively reducing vehicle body vibration and therefore booming noise due to the vibration.

Figure 11:
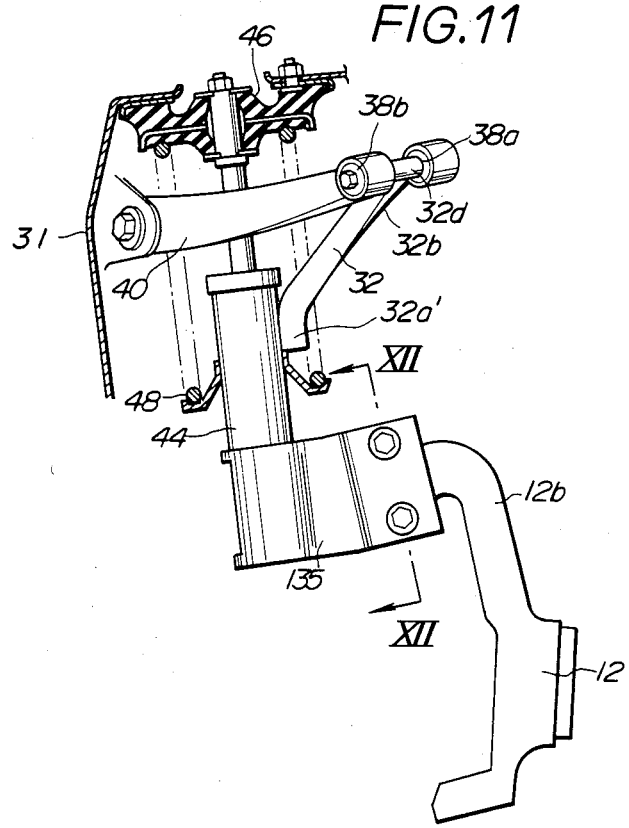
FIG. 11 is a fragmentary front elevation similar to FIG. 7 showing a fifth embodiment of the suspension system in accordance with the present invention.
Figure 12:
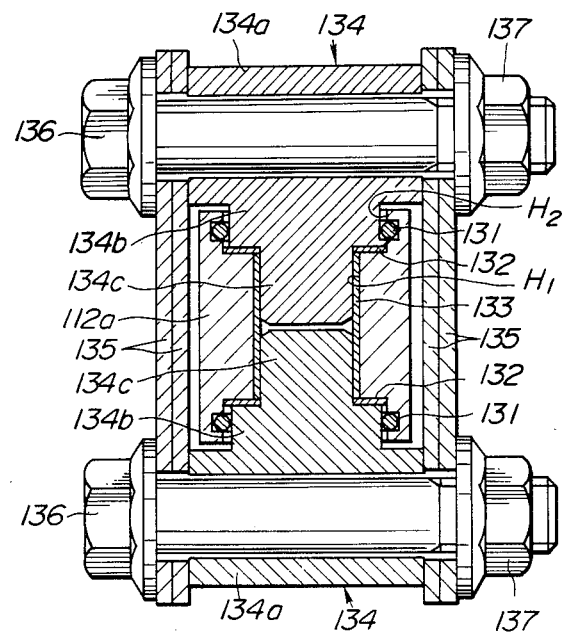
FIG. 12 is a sectional view of a joint taken in the direction of arrows substantially along line XII—XII of FIG. 11.
Figure 13:
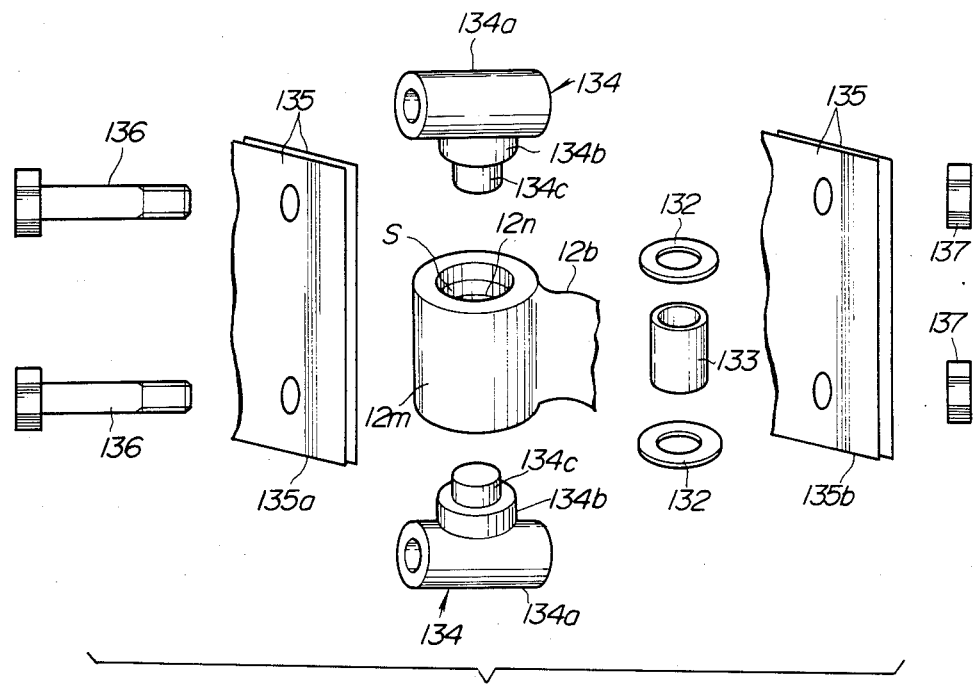
FIG. 13 is an exploded perspective view of the joint of FIG. 12.

FIGS. 11 to 13 illustrate a sixth embodiment of the suspension system according to the present invention, which is similar to the fifth embodiment of FIG. 7 with the exception that the lower section of the shock absorber 44 is rotatably supported by the upper section 12b of the knuckle 12, and the lower end section 32a' of the extension member 32 is fixedly secured to the outer cylinder of the shock absorber 44. More specifically, in this embodiment, the knuckle upper section 12b is formed with a cylindrical portion 12m whose axis is generally vertical. The cylindrical portion 12m has a generally vertically extending through-hole 12n which includes a central small-diameter hole section $H_1$ and two large-diameter hole sections $H_1$ which are located on the opposite sides of the hole section $H_2$ and opened to the opposite end faces of the cylindrical portion 12m. A step section including an annular flat surface S is formed between the hole sections $H_1$, $H_2$. An O-ring 131 is fitted on the peripheral surface of each large-diameter hole section $H_2$. An annular sliding washer 132 is disposed in contact with the flat surface S of the step section. A sliding bushing 133 is disposed within the small-diameter hole section $H_1$ and interposed between the oppositely positioned sliding washers 132. In this embodiment, the axis of the cylindrical portion 12m is which is aligned with the steering axis 36 aligned with the axis of the ball joint 26 for connecting the knuckle lower section 12a and the lower control arm 28 though not shown.

Two supporting members 134 are rotatably attached to the cylindrical portion 12m in such a manner as to be positioned opposite with respect to the cylindrical portion 12m. More specifically, each support member 134 includes a generally horizontally extending cylindrical boss section 134a having a through-hole (no numeral). A large-diameter cylindridal projection 134b is integrally formed on the side cylindrical outer face of the boss section 134a. Additionally, a small-diameter cylindrical projection 134c is integrally formed on the top end face of the large-diameter cylindrical projection 134b. The projections 134b, 134c of the supporting member 134 is inserted into the hole 12n in such a manner that the cylindrical projections 134b, 134c are respectively located in the hole sections $H_2$, $H_1$. Accordingly, the small-diameter cylindrical projection 134c is rotatably fitted in the cylindrical sliding bushing 133. The large diameter projection 134b is contacted at its end face with the annular sliding washer 132 and at its outer periphery with the O-ring 131.

A band member 135 for securely grasping the lower section of the shock absorber 44 is secured to the support members 34 in such a manner that the support members 134 are interposed between the opposite end sections 135a, 135b. More specifically, the opposite end sections 135a, 135b of the band member 135 are disposed to contact with the opposite end faces of each support member 134 so that openings (no numerals) of the band member end section 135a, 135b meet the through-holes of the support member cylindrical boss sections 34a, resectively, upon which each bolt 136 is inserted through the corresponding opening and through-hole and tighened by engaging a nut 37 screwed on the bolt 136.

Thus, the shock absorber 44 is attached to the upper section 12b of the knuckle 12 to be relatively rotatable around the steering axis (not shown) passing through the ball joint 26 between the knuckle lower section 12a and the lower control arm 28. It will be appreciated that, with the arrangement of FIGS. 12 and 13, the play of the joint between the shock absorber 44 and knuckle 12 can be securely omitted thereby obtaining a smooth relatively rotatable joint therebetween without using shims which have been required in such a joint.

While only the front suspension systems for the vehicles of the front engine front wheel drive type or the four wheel drive type have been shown and described, it will be understood that the principle of the present invention may be applicable to other suspension systems such as a front suspension system for a vehicle of the front engine rear wheel drive type.

What is claimed is:

1. A double link suspension system for a vehicle, comprising:
    a knuckle for rotatably supporting a wheel for the vehicle which has a tire mounted thereon, said knuckle having an upper and a lower end;
    a first joint which is connected to the lower end of said knuckle;
    a second joint which is connected to the upper end of said knuckle;
    a lower control arm having a first end which is rotatably connected to the lower end of said knuckle by said first joint, and a second end which is rotatably connected to a side of a vehicle body;
    an extension member having a first end which is rotatably connected to the upper end of said knuckle by said second joint, and a second end, said extension member being rotatable relative to the upper end of said knuckle around a straight line passing through said first joint;
    a third joint which is connected to the second end of said extension member; and
    an upper control arm having a first end which is rotatably connected to the second end of said extension member by said third joint, and a second end which is rotatably connected to the side of the vehicle body,
    said second joint lying radially inward with respect to the radial center of the wheel from a plane which is substantially parallel to the ground and passes through the center of a line which connects the points of maximum width of the top of the tire, and said third joint lying radially outward with respect to the radial center of the wheel from the plane.

2. A double link type suspension system as claimed in claim 1, further comprising a shock absorber disposed generally vertically near said extension member.

3. A double link type suspension system as claimed in claim 2, wherein said shock absorber has an upper end connected to the side of the vehicle body.

4. A double link type suspension system as claimed in claim 1, wherein said vehicle is a front engine, front wheel drive vehicle.

5. A double link type suspension system as claimed in claim 1, wherein said vehicle is a four wheel drive vehicle.

6. A double link type suspension system as claimed in claim 1, wherein said wheel has an axle shaft connected through a constant velocity joint to a drive shaft which is driven by an engine, said axle shaft being rotatably journalled by said knuckle.

7. A double link type suspension system as claimed in claim 1, wherein said first joint is a ball joint whose axis is aligned with said straight line.

8. A double link type suspension system as claimed in claim 7, wherein:
    said second joint has an axis of rotation which coincides with the straight line passing through said first joint; and
    said third joint is disposed outside of a first vertical plane containing a point in said upper control arm which lies on the straight line passing through said first joint, said third joint being located between said first vertical plane and a wheel vertical plane which contains the center line of the wheel and which is perpendicular to the axis of rotation of the wheel.

9. A double link type suspension system as claimed in claim 8, wherein the straight line serves as a steering axis.

10. A double link type suspension system as claimed in claim 9, wherein said ball joint includes a ball stud secured to the lower end of said knuckle, said ball stud having an axis which is aligned with said straight line, and a retainer for retaining said ball stud which is secured to said lower control arm.

11. A double link type suspension system as claimed in claim 8, wherein the point in said upper control arm is spaced apart from said third joint.

12. A double link type suspension system as claimed in claim 9, wherein the straight line intersects the wheel vertical plane at a point above a road surface with which the wheel is in contact.

13. A double link type suspension system as claimed in claim 12, wherein the straight line intersects the road surface at a point outside of the wheel vertical plane with respect to the vehicle body.

14. A double link type suspension system as claimed in claim 8, wherein said second joint includes a shaft portion which is formed on the upper end of said knuckle and which has an axis which is aligned with the straight line, and a cylindrical portion which is formed on the first end of said extension member and disposed around said shaft portion and rotatable relative to said shaft portion.

15. A double link type suspension system as claimed in claim 14, wherein said second joint includes a cylindrical bushing interposed between said shaft portion and said cylindrical portion.

16. A double link type suspension system as claimed in claim 8, wherein said second joint includes first and second ball joints whose axes are aligned with each other and with said straight line, each ball joint rotatably connecting the upper end of said knuckle and the first end of said extension member.

17. A double link type suspension system as claimed in claim 8, wherein said second joint includes first and second annular ball bearings whose axes are aligned with each other and with said straight line and an elongated member which is secured to the first end of said extension member, and the upper end of said knuckle has a cylindrical portion which surrounds said elongated member, each ball bearing being interposed between said elongated member and said cylindrical portion.

18. A double link type suspension system as claimed in claim 3, wherein said shock absorber has a lower end which is connected to said lower control arm.

19. A double link type suspension system as claimed in claim 8, wherein said third joint includes an elastomeric bushing interposed between the second end of said extension member and the first end of said upper control arm.

20. A double link type suspension system as claimed in claim 8, wherein said third joint is positioned outside of a vertical plane which passes through the uppermost section of the wheel and which is perpendicular to the wheel vertical plane.

21. A double link type suspension system as claimed in claim 20, wherein said third joint is positioned forward of the uppermost section of the wheel relative to the vehicle body.

22. A double link type suspension system as claimed in claim 20, wherein said third joint is positioned rearward of the uppermost section of the wheel relative to the vehicle body.

23. A double link type suspension system as claimed in claim 20, wherein said third joint includes an elastomeric bushing interposed between the second end of said extension member and the first end of said upper control arm, said elastomeric bushing being located below the top of the uppermost section of the wheel.

24. A double link type suspension system as claimed in claim 8, wherein said third joint includes a common rod member which extends generally in the fore-and-aft direction of the vehicle and first and second elastomeric bushings which are mounted on said common rod member and are axially separated from each other, the first end of said upper control arm being mounted on said first and second elastomeric bushings, the second end of said extension member being securely connected to a part of said common rod member between said first and second elastomeric bushings.

25. A double link type suspension system as claimed in claim 24, wherein said upper control arm includes first and second elongated sections which are integrally connected with each other, each elongated section having a first end on which is formed a cylindrical part which is mounted on one of said first and second elastomeric bushings, and a second end portion which is elastically connected to the vehicle body side.

26. A double link type suspension system as claimed in claim 2, wherein said shock absorber has a first end which is connected to the side of the vehicle body, a second end, and a cylindrical outer wall which is securely attached to the first end of said extension member.

27. A double link type suspension system as claimed in claim 26, further comprising a fourth joint which pivotally connects the second end of said shock absorber to the upper end of said knuckle.

28. A double link type suspension system as claimed in claim 1, wherein said second joint includes a portion of the first end of said extension member and a portion of the upper end of said knuckle.

* * * * *